July 23, 1935.　　　P. VAN H. WEEMS　　　2,008,734
METHOD OF AND APPARATUS FOR NAVIGATOR'S TIME KEEPING
Filed July 31, 1929　　　5 Sheets-Sheet 3
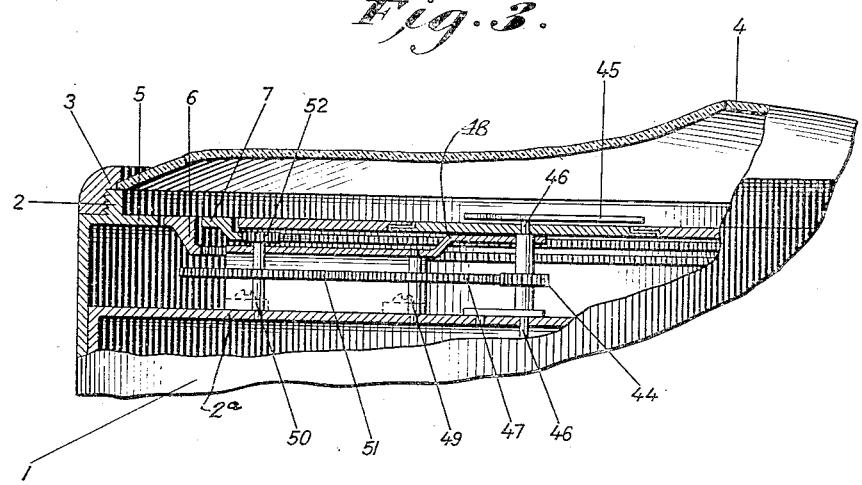
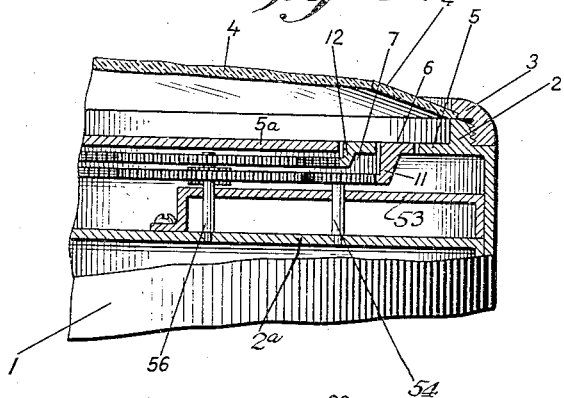
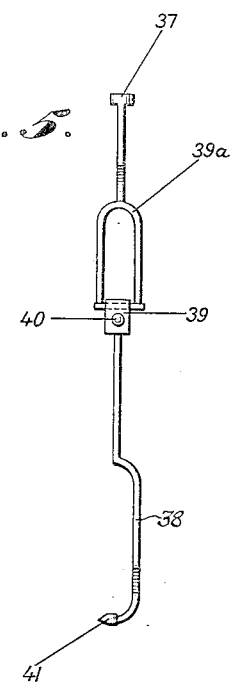
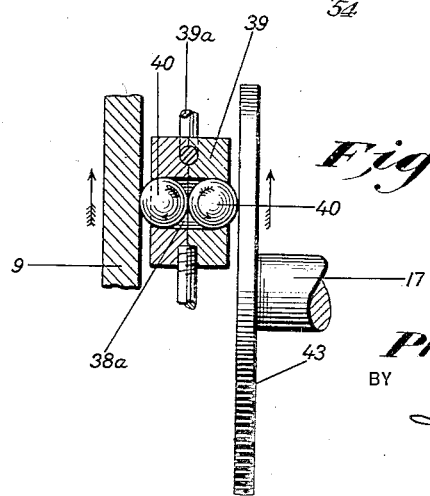
INVENTOR
*Philip Van Horn Weems.*
BY
*Harold Dodd.*
ATTORNEY

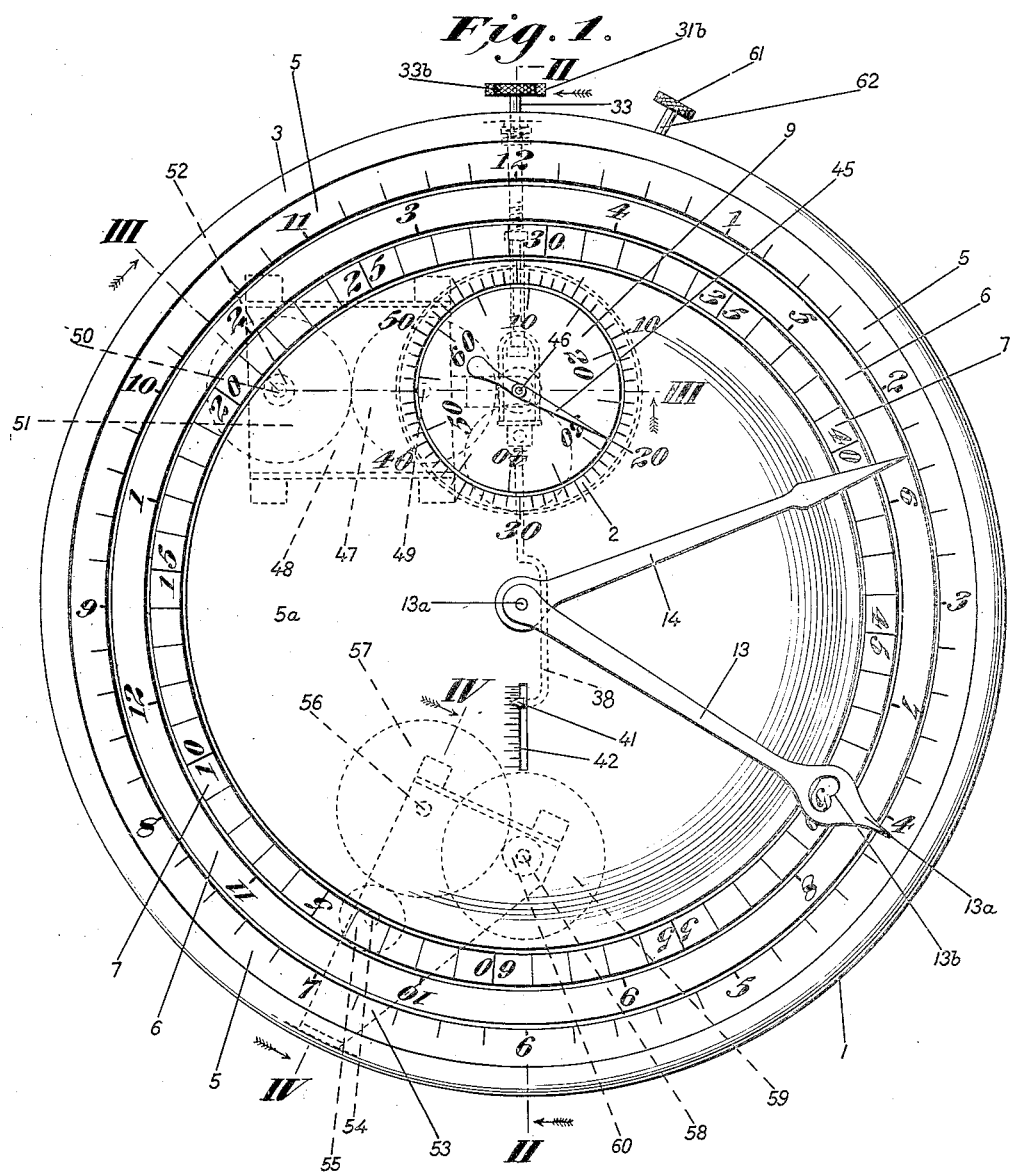

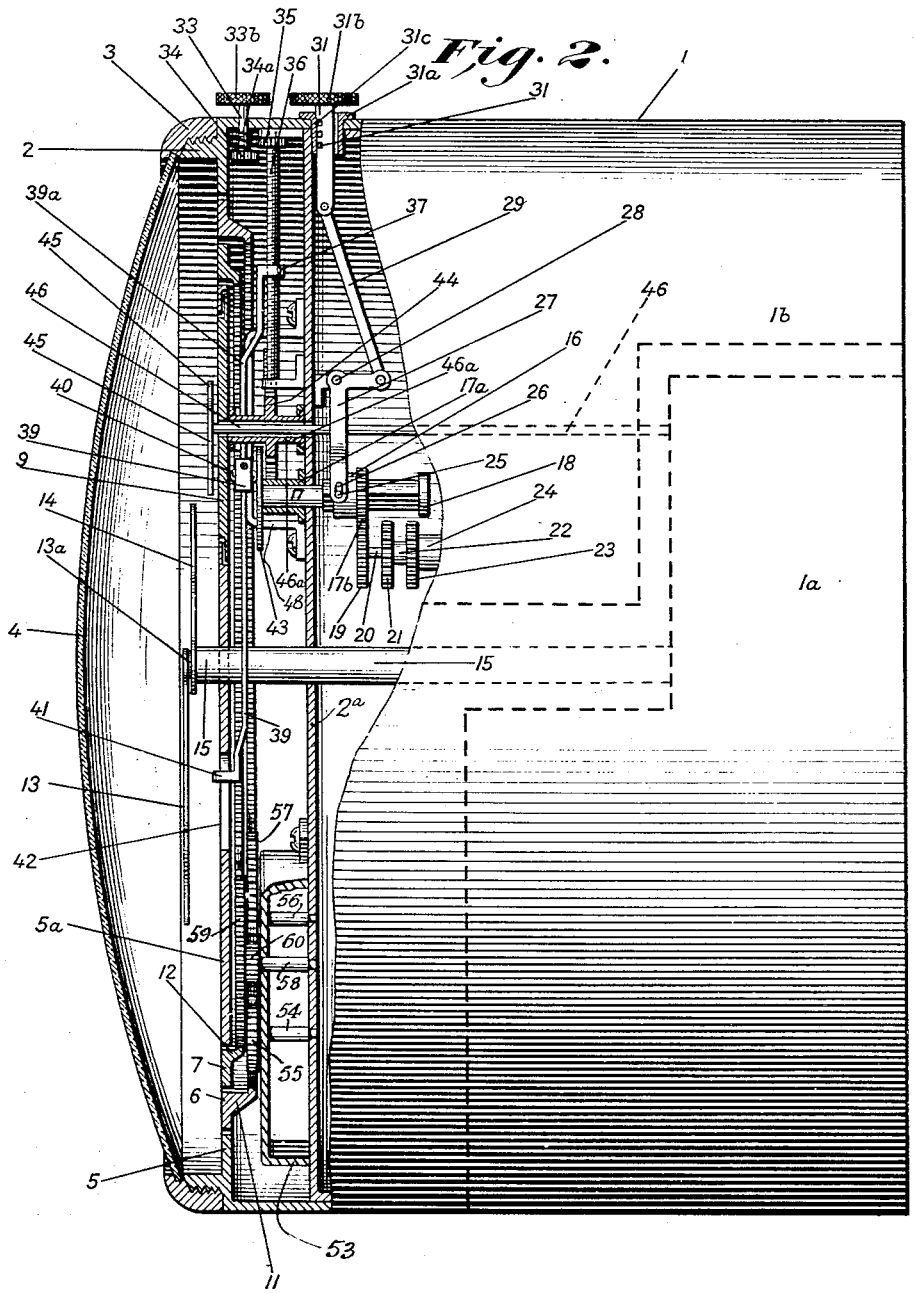

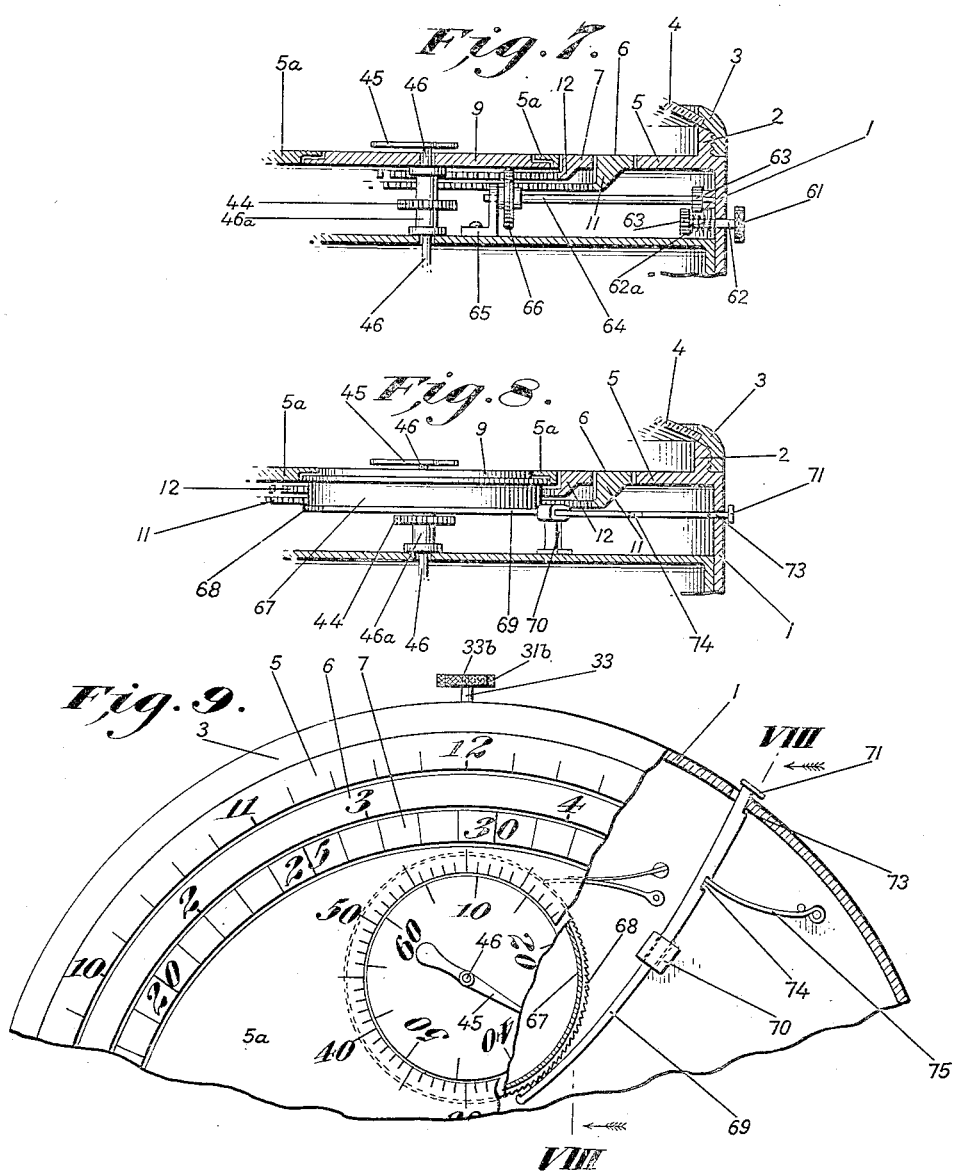

July 23, 1935.  P. VAN H. WEEMS  2,008,734
METHOD OF AND APPARATUS FOR NAVIGATOR'S TIME KEEPING
Filed July 31, 1929   5 Sheets-Sheet 5

INVENTOR
Philip Van Horn Weems.
BY
Harold Dodd
ATTORNEY

Patented July 23, 1935

2,008,734

UNITED STATES PATENT OFFICE 2,008,734

METHOD OF AND APPARATUS FOR NAVIGATORS' TIME KEEPING

Philip Van Horn Weems, Coronado, Calif.

Application July 31, 1929, Serial No. 382,562

40 Claims. (Cl. 58—3)

(Granted under the act of March 3, 1883, as amended April 30, 1928; 370 O. G. 757)

My said method and apparatus relates to timekeeping for all navigators as well as for employment in aerial navigation where the problems are more grave and difficult than any other navigation, due to the essentially higher speed of aircraft, the limited time in which a navigator must make his determinations, the limited equipment and space available in such craft therefor, the fact that at times only one person may be on an aircraft with his time usually so occupied in keeping the same safely in the air that he has little time to devote to matters concerning the various times necessary in navigation determining as well as to such determinations.

My invention provides the method and means whereby the keeping of the various times required in navigation and the ascertainment thereof may be afforded readily, even in aircraft and to the operator of a one-man craft without imperiling his management of said craft, as well as without appreciably encumbering such craft.

Heretofore navigators have been obliged to keep separate chronometers for the keeping of the several times which they are obliged to so accurately keep. Heretofore even a one percent error in a chronometer movement, having 3,600 seconds per hour, will result in an error of 36 seconds per hour, which will result in an error of approximately nine miles in determining the navigator's position. Such error is fraught with grave liability endangering life and property. Greater percentages of chronometer error have heretofore resulted in correspondingly larger errors in position determining. Heretofore, to obviate such grave errors and liabilities each of the regular chronometers have been obliged to be very delicately and expensively constructed and maintained in specially cushioned mountings.

With water navigation such several chronometers and their said mountings, and their required weight, space and attention were not such a serious problem as with aerial navigation.

Heretofore for complete chronometer equipment the following chronometers would be required:—One keeping Greenwich civil time; one keeping Greenwich sidereal time; one keeping time by the true sun; and one keeping time by the mean sun. Where a lesser number of chronometers are employed time is required to compute the other required times from those afforded.

While the advent and prevalency of radio and its facilities for the checking of the several times have somewhat ameliorated this condition by more frequent such time checkings, it has heretofore been somewhat unsatisfactory in water navigation and far more unsatisfactory in aerial navigation.

The great problem in all kinds of navigation, which is more acute in aerial navigation due to its greater required and possible speeds, is to minimize to the greatest practical degree the effects of chronometer errors, so that lighter, cheaper and substantially mountingless chronometers may be availed of with as much, or greater, accuracy as now available with the cumbersome, expensive mounted chronometers.

To illustrate, the maximum difference between the true sun and the mean sun varies from a maximum of about thirty seconds in twenty-four hours, so that such difference exists between time by the true sun, or apparent time, and time by the mean sun, mean time; while the difference between said apparent time at Greenwich and Greenwich sidereal time differs approximately ten seconds per hour. Other times have differences but the foregoing typical instances are sufficient for illustration.

The object of this invention is to provide a method and apparatus for keeping time, for instance navigator's time, or times, with greater accuracy and to dispense with, or lessen the necessity of, frequent recourse to more expensive chronometers comparatively inexpensively and by which the several times required, for instance, by a navigator, may readily be indicated with great, or greater than heretofore, accuracy by relatively light and inexpensive means.

To attain these and other objects, and in accordance with the general features of this unitary and related invention, my improved method takes advantage of the physical fact of the differences existing between the several times and utilizes said fact to attain greater accuracy, even with a cheaper mechanism than otherwise would be practical for purposes of navigation, especially aerial navigation.

Said method contemplates in one step thereof the keeping of any one of the desired times by any standard lever escapement time movement, or otherwise, and contemplates as a further step the provision of a separate like time movement, movable only at the rate of difference between the time provided in said first-named step and the other time required, and to associate said two times in substantially close proximity so that the same may, when desired, be read simultaneously. In said association said last named step contemplates that the indices for both said times shall be the same, in the sense that where time according to the first-named step is indicated by the relative movement of a dial and pointer, the time kept by the second-named step shall be likewise kept by the relative movement of a dial and pointer, the pointers being the same, and likewise where the time by the first step is kept by hands moving over a stationary dial, the time by the second named step is kept by said same hands moving over a dial which moves relative to said stationary dial. It is further contemplated that the dial, or equivalent, of said second step shall be moved by its preferably separate clock movement and that such movement be counter-clockwise, or clockwise, as may be required, to that of the pointer or hands moved by said first step clock movement. It is also contemplated that said different times may be kept by different time movements associated and amalgamated as aforesaid, although when desired one time movement may keep said plurality of times.

To illustrate the superior accuracy attained by this method, reference is had to the aforesaid one percent. error in chronometer movement resulting in an error of approximately nine miles in determining the navigator's position, it may be noted that even a ten percent. error in such time determined by said second step of my method would result in an error in said time of approximately one second, or about five hundred yards in the determination of a navigator's unknown position, which latter is negligible although such a wide margin of error is exceptional with even the cheapest chronometers.

Other ratios of error between the time as kept by the first step of my method and the time as kept by the second step of my method are substantially correspondingly minimized, which results in substantially corresponding reduction to relatively negligible limits the error in determining the navigator's unknown position in which such time as is ascertained or determined by the said second step of my method is employed as a factor.

To demonstrate the practical utility of my said method, a related, improved, and novel apparatus embodying my invention, and which may be used advantageously and economically in practicing said improved method as a unitary invention, is provided to also serve as an example, to those skilled in the art, of the facility with which, after becoming familiar with my invention, the many forms and kinds of existing apparatus, with or without substantial modification, may be employed in the efficient practice of my said method in like or kindred production.

Said provided apparatus contemplates and comprises a chronometer which may have two independent lever escapement, or other type, time movements with the usual hands moving over a stationary dial, or the equivalent thereof, for the normal one of said time movements. The second time movement runs at a very substantially slower rate of movement, and may be provided with a plurality of means each driven at a substantially different speed from that of the other time movement, each of said last-named means being connectible at will preferably with a movable dial or dials provided with indications thereon denoting time desired thereby, or equivalent means, whereby said dial or dials, or equivalent, may be driven proportionate to said second time movement. Said movement of said dial or dials, or equivalent, is preferably not provided with indices or hands to indicate the time thereon, but the indices or hands, or equivalent, of the first time movement is or are adapted to indicate the time measurable by said second time movement, said dial or dials being driven counter-clockwise or otherwise.

A further object of my invention is to provide variable speed means between said movable dial and the selected one of the plurality of means driven at different speeds by said second time movement, and thereby to overcome the difficulty and cumbersomeness of providing a fixed different driven speed means for said second time movement for each of the varying rates at which it may be necessary or desirable for said second time movement to drive its indicating means. Thus major differences in speed may be accomplished by connecting the indicating means of said second time movement to the desired one of said plurality of means which said movement drives at different speeds, while intermediate refinements of speed changes are attainable by said intermediate variable speed connecting means.

A further object of my invention is to provide means by which the indicating means for said second time movement may be set to zero or other definite point and that said setting means be preferably independent of the indicating means for the first time movement, thereby facilitating frequent ready changes of the second time movement indicating means to indicate any other different time desired, and that said setting may be in accordance with known data relative to the time indicated by said first time movement, or in accordance with a checking or time received by radio, or otherwise.

These and other objects of my invention will be more apparent from the following detailed description and the accompanying drawings, illustrating more or less diagrammatically one embodiment of my new and useful invention in an improved apparatus, of the many different forms and characters of apparatus, each of which may be employed in the practice of my improved method.

Figure 1 shows a front view of an apparatus embodying my invention.

Figure 2 illustrates a partial sectional view thereof along substantially lines II—II of Figure 1.

Figure 3 illustrates a partial sectional view thereof along substantially lines III—III of Figure 1.

Figure 4 illustrates a partial sectional view thereof substantially along sectional lines IV—IV of Figure 1.

Figure 5 illustrates a front elevation view of a modification of the intermediate speed control means and its indicator for said second time movement.

Figure 6 is an enlarged side elevation view partially in section of said intermediate variable speed means.

Figure 7 illustrates a partial sectional view in the region of the second time indicating means and illustrates a means for setting the movable seconds indicating dial of the second time movement.

Figure 8 is a view similar to Figure 7 but illustrates an optional different setting means therefor taken substantially on the section line VIII—VIII of Figure 9 with other portions of the device broken away.

Figure 9 is a front elevation view of the optional means illustrated in Figure 8 and with portions of the casing broken away for clearness.

Figure 10 illustrates a fragmentary sectional side elevation view of a different optional means for the setting of said seconds indicating dial and second time movement.

Figure 11:
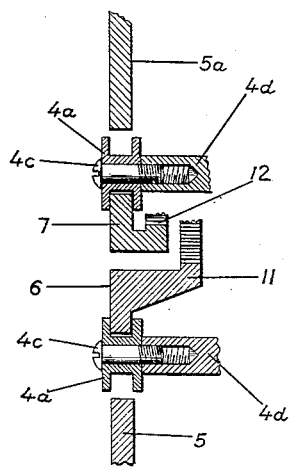
Figure 12:
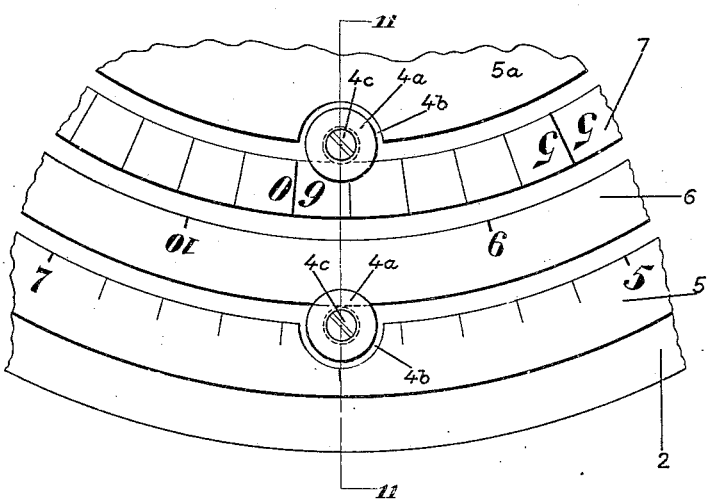

Figures 11 and 12, respectively, illustrate a side elevation view partly in section and a partial front view thereof of the means for revolubly mounting each of the several rotating dials of the second time movement.

Figure 13:
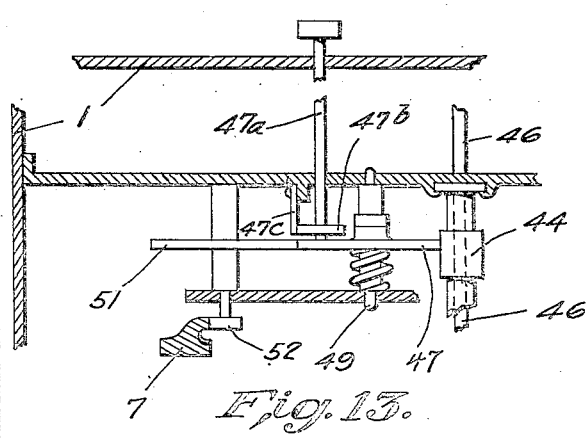

Fig. 13 is a diagrammatic view in horizontal cross section of the minute setting means.

Figure 14:
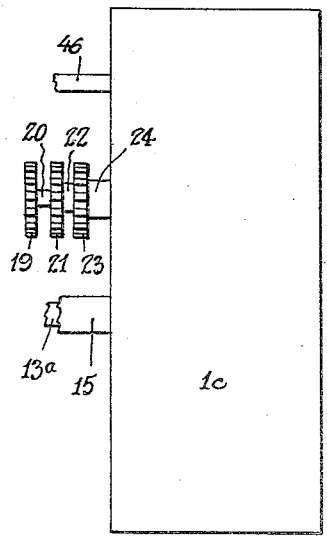

Fig. 14 is a view of a single clock movement adapted to displace and perform the functions of the separate clock movements 1a and 1b of Fig. 1.

The rotating dials, or their equivalent, of the second time having their time pointed to by the means, or other equivalent, of the first time movement, and said dials, or other equivalent of said second time movement, being moved counter-clock-wise, or otherwise, require that such counter-clock-wise movement be only at the rate of difference between the time provided by the first time movement and the time required by the second time movement.

Consequently, if the first time movement indicates time by the true sun, or apparent time, and it is desired that the second time movement indicate time by the mean sun, or mean time, then and in such case, there being only about 30 seconds difference between said times in a period of 24 hours, the second time movement is only required in such case to drive its movable dials only at the rate of 30 seconds per 24 hours. Consequently, the difference between Greenwich apparent time and Greenwich sidereal time, differing approximately only 10 seconds per hour, where the indicating means of the first time movement indicate Greenwich apparent time and it is desired that the indicating means of the second time movement indicate Greenwich sidereal time, then and in such case it is only necessary that the indicating means of the second time movement be driven at the rate of approximately 10 seconds per hour. This will typify the function of the several time and indicating means amalgamated together.

This condition also accounts for the relatively greater accuracy of the time indications of the second time movement.

The clock case (1) contains two separate clock movements, respectively (1a and 1b), indicated in Figure 2 diagrammatically by dotted lines, (1a) being hereinafter termed the primary time and (1b) secondary time movements, (1a) being an accurate or governing movement carrying the hour hand (14) through the hour hand tubular shaft (15), the minute hand (13) through a shaft (13a) inside of (15), the seconds hand (45) through shaft (46). The rest of the movement (1a) is omitted as it contains no unusual or novel features, except the overlapping of parts of movements (1a) and (1b). Case (1) carries the hour and minute dial (5) of the primary clock as well as the seconds dial (9) which may be rotated, as later described, to set seconds. Other necessary or usual details are the threaded front flange (2) of the clock casing to which the crystal holder (3) screws to retain the protective crystal (4). The secondary time is read by means of the hands of the primary clock and rotating dials, of which the movable hour dial (6) is read by hour hand (14), the movable minutes dial (7) is read by minute hand (13). These dials are geared together as follows after the dials have been set: The movable seconds dial (9) is driven by the ball (40) of the rate varying mechanism hereinafter described, and is attached to a gear (44), Figs. 1, 2, and 3, rotating freely on shaft (46) and drives gear (47) on shaft (49) which shaft is supported by journals in bracket (48) and the front plate of the clock. Gear (47) in turn drives gear (51) on shaft (50), which shaft rigidly carries pinion (52) and is supported by journals in bracket (48) and the front plate of the clock. Pinion (52) in turn drives gear collar (12), Figs. 4 and 11, attached to the movable minutes dial (7). The total gear ratio is such that the minutes dial makes one revolution to every sixty revolutions of the seconds dial.

The movable minutes dial 7 drives the movable hour dial 6 through the following gearing, Figs. 1 and 2: Gear collar (12) fixed on the minutes dial 7 drives gear (59) on shaft (58) which also carries pinion (60) and is in journals of bracket (53) and the front plate 2a of the clock. Pinion (60) in turn drives gear (57) on shaft (56) which is also carried in journals by the bracket (53) and the front plate 2a of the clock. Gear (57) in turn drives gear (55) on shaft (54) which is also carried in journals by bracket (53) and the front plate 2a of the clock. Gear (55) in turn drives geared collar (11) which is attached to or integral with the movable hour dial (6). The gear ratio as shown is such that hour dial (6) makes one revolution for 12 revolutions of the minutes dial (7) but may be changed to accommodate any desired time, as for instance, in the case where it is desirable to read in days of 24 hours instead of in two periods of 12 hours.

The rotating dials above are driven by a sufficiently powerful secondary timepiece through change speed gears and a continuously variable transmission as follows: The secondary or power movement is provided with three speed shafts, shaft (20) carrying gear (19), shaft (22) carrying gear (21), and shaft (24) carrying gear (23), all gears being cut to mesh with sliding gear (17b) on splined shaft (17) by means of which the proper speed shaft of the driving clock is connected to the variable speed device. Splined shaft (17) is supported in a journal (17a) attached to the front plate of the clock, carries at the journal end integrater plate (43) which is preferably fixed to it, and at the other end a stop collar (18) for retaining sliding gear (17b) on the shaft. Sliding gear (17b) is provided with a long hub upon which collar (16) rotates freely, and there is a fixed collar attached to the end of the hub to prevent sliding of collar (16) in a longitudinal direction relative to the gear (17b).

The gear (17b) is moved along splined shaft (17) by the following mechanism: Change speed gear stem (31) sides in bushing (31a) when its knurled head (31b) is pushed back against retaining spring (not shown) to disengage the locking grooves in (31) from the locking tongue (31c) on the bushing (31a), thereby pulling link (29) along with it. Link (29) is attached to stem (31) and bell-crank lever (27) by pinned or otherwise flexible joints permitting movement. Bell-crank (27) is caused to rotate about journal (28) which is carried by a small bracket attached to the back of the front plate of the clock, and in rotating the sides of slot (26) push on pin (25) which is attached to collar (16), thereby moving gear (17b) along splined shaft (17).

The continuously variable speed transmission consists of a driving integrator plate (43) and a driven plate preferably consisting of seconds dial (9), between which are held preferably two integrator balls (40) by means of a hole in integrator slide (39), so that the friction of (43) on right hand ball (40), causes the latter to rotate, the rotation is transferred by friction to the left hand integrator ball (40), and the rotation of the latter is transferred by friction to dial (9). A suitable spring (not shown) acting on collar (18) serves to provide the necessary pressure between said plates (43) and (9), and a suitable thrust bearing or collar on hollow shaft (46a) to which the seconds dial is attached prevents release of this pressure by longitudinal motion of the shaft. The relative speed and direction of movement of the integrator plate and seconds dial may be varied by sliding integrator slide (39) radially across the two plates, seconds dial (9) and integrator plate (43).

Neglecting slip, the ratio of the speeds of rotation of dial to integrator plate will be directly proportional to the ratio of the radius from the center of the integrator to the point of contact of right hand ball (40), to the radius from the center of the seconds dial to the point of contact of the left hand ball (40). The direction of rotation is reversed by moving the slide (39) to the other side of the center of integrator plate (43). Integrator slide (39) is attached to a yoke (39a) which fits over and slides past shaft (46a) to guide the motion of (39) and is threaded at its upper end 37 to receive rate indicator screw (36) by whose rotation the integrator slide (39) is caused to move, thereby varying the rate of the movable dials relative to the primary or governing clock mechanism. Indicator screw (36) is journaled into brackets attached to the front plate of the clock and the clock case (1) respectively, and carries at its upper or clock case end a pinion (35) (Fig. 2) fixed to itself, the pinion being normally disengaged from pinion (34) attached to rate setting stem (33). The rate on the secondary clock may be set by pulling on the knurled head of stem (33) so as to compress spring (34a), which holds pinions (34) (35) normally disengaged, and engage pinions (34), (35), when rotating the knurled head until the proper rate is indicated on the graduations on slot (42) on which an indicator (41) slides, the latter being attached to the integrator slide (39) by a rigid connection (38) suitably formed to pass interfering shafts in the clock. The intervals on the graduated slot will not be of equal length for equal change in rate. As many scales or indices as there are change speed gears may be provided, if desired.

Several means have been shown for setting the secondary clock to exact seconds, in all cases the dial and not the hand is set, any one of which may be used for setting the fixed or governing or primary clock seconds if desired.

In Figure 7, seconds dial (9) is continually in contact with friction wheel (66) fixed on shaft (64) which is in turn journaled into a bracket (65) attached to the front plate of the clock and the case of the clock. To the case end of the shaft (64) is attached a pinion (63). A seconds setting stem (62) carrying a knurled head at the outer end and a pinion at the inner end, is normally held in such position that the pinions (63) are disengaged by the pressure of spring (62a). Setting is accomplished by pulling stem (62) out against the pressure of spring (62a) to engage pinions (63), whereupon the knurled head may be rotated, forcing friction wheel (66) to move seconds dial (9) against the friction of integrator balls (40).

In Figures 8 and 9 a second means for setting the seconds dial is shown. Seconds dial (9) is provided with a drum extension (67) with a flange (68) upon which ratchet teeth are cut. A pawl (69) arranged to slide in support bracket (70) fastened to the front plate of the clock is provided with a head (71) which prevents (69) falling into the clock and may be used to pull (69) outwards. A spring (75) engages with a slot (74) in pawl (69) tending to hold the pawl inwards as shown. The pawl is provided with a slot (73) which catches on case (1) in the position shown for preventing rattling. By pulling on (71) pawl (69) engages ratchet (68) and moves dial (9) a few seconds divisions against the friction of the integrator balls (40).

A third means of setting seconds is shown in Fig. 10. This means is the same as that shown in Fig. 7 excepting for the substitution of a gear (77) on shaft (78) for friction wheel (66) on shaft (64), and the provision of a gear (76) on dial (9) with which gear (77) engages. The mode of operation is the same as for Fig. 7.

No means of support for dials (6) and (7) are shown other than in Figures 11 and 12 consisting of a plurality of grooved rollers (4a) set in relieved portions (4b) respectively of stationary dials (5) and (5a) with their grooved portion bearing respectively upon the outer and inner peripheries of movable dials (6) and (7) at a plurality of points, each of said rollers being revolubly mounted upon a stud screw (4c) threaded into a portion (4d) of frame (1); while the seconds dial (9) may be likewise revolubly mounted in other similar rollers (4a) likewise mounted.

Means may be provided, as shown in Fig. 13, for setting the movable minutes dial 7 as follows: Gear (47) on shaft (49) may be arranged to slide longitudinally out of engagement with gear (51), by a thrust on stem 47a extending in the instance shown, to and through the back of casing 1, pinion (44) being lengthened so (47) and (44) remain in engagement, whereupon a small pinion 47b rigid on stem 47a may be forced to engage gear (51), so that turning of a stem 47a carrying this pinion will move the minutes dial and the hour dial to which it is geared. It would be a simple matter to make pinion engage just as the gear (47) disengaged. It would be a simple matter to secure engagement of (47) and (51) again by providing a spring leaf 47c, fixed to a portion of casing 1, bearing against the setting pinion 47b which would click for every tooth which passes.

Means may be provided for setting the hour dial in a similar manner. In this case gear (55) could be arranged to slide out of engagement with (57) while remaining in engagement with (11), it being possible to cause a pinion for setting to engage (54). Gear face (54) would have to be widened, as would also gear face (11).

In any of the means shown for setting the seconds dial, it would be possible to retract integrator plate (43) by pulling on splined shaft (17) to retract it against spring (not shown). Such an effect could easily be attained by the outward pull on stem (31) being transmitted through suitable links, levers, or other convenient means. Such a result might be accomplished with equal ease in the case of the movement of the pawl before the first tooth is engaged.

Though the device as described is a clock suitable for navigation purposes, and as described and shown is capable of operation as described, substitutions may be made for almost every part of the mechanism within the limits of the claims.

The change speed gear, continuously variable speed transmission may be modified. The change speed gears may be arranged, so as on machine tools, to give a series of fixed speeds accurately, at will; the size of the integrator plate may be increased so that only a portion of the radius of the plate is available, instead of the whole diameter, the idea being to reduce the errors of the continuously variable speed mechanism by reducing its duties to producing a plus or minus 5% modification (by way of illustration) in the fixed shaft speed, while the device as described cares for the whole dial speed and is subject to the full inaccuracy of the variable device. Reverse gears may be included in the gear set if desired for securing both faster and slower times on this mechanism. Any suitable continuously variable speed device may be substituted for the device described, provided only that it is capable of the accuracy required of it in accurately duplicating a given rate at will.

Where the convenience of use demands that the secondary clock faces remain fixed in position, an inversion in the mechanism may be secured as follows: Each hand is carried on the shaft as a sun gear. The sun gears are driven by planet gears carried on spiders which rotate about the same axis, and are direct driven from the control of the primary clock. If the ring gear surrounding the planet gears remains fixed, the movement of the hands is determined by the rotation of the spiders. If the secondary clock is to gain or lose time, the ring gears are caused to rotate in the proper direction and with the proper speed by the secondary movement through the variable speed device. The ring gears for the hour, minute and second hands are geared together in proper ratio. Similarly, each ring gear is geared to dial on which the fixed rate time is read, so that these dials will gain or lose at the same rate as the hands by which the movable dials are read, so that the movable dials will read the primary fixed rate time. The variable clock is read on fixed dials. Other details of the clock may be similar to those of the particular form of the device described.

The secondary time movement (1b) driving its respective gears (19), (21) and (23) at different relatively slow rates of speed will, when gear (17b) is brought laterally into meshing engagement with one of said gears (19), (21) or (23), cause the integrator plate 43 to rotate at correspondingly different, yet slow, speeds, the neutral axis of integrator plate 43 being substantially midway of the radius of movable second dial (9). The intermediate motion transmitting balls (40) may, in their engagement with integrator plate 43 toward the center of second dial (9) cause said dial (9) to rotate at varying speeds in one direction, while when said balls (40) are adjusted to the opposite side of plate (43) they will cause dial (9) to be rotated at different rates but in an opposite direction.

This is designed to provide for the movement of the movable dials of the secondary time movement not only counter-clock-wise where the time to be kept by the secondary time movement is slower than the time kept by the primary clock movement, but it also contemplates and provides for the opposite condition wherein the time to be kept by the secondary time movement (1b) is faster than the time kept by the primary time movement (1a) and in such case the movable dials (6), (7) and (9) of the secondary time movement (1b) are not to move counter-clock-wise but are in such last-named case moved clock-wise but only at the rate which their time indicated is faster than the time kept by the primary time movement (1a).

Substantial adjustment is, therefore, necessary, the said variable movement transmitting balls (40) and a close positioning and maintenance of the adjustment of said balls (40) relative to the centers of discs (9) and (43) is necessary to be maintained with fineness and accuracy. To this end the upper member (39a) of the ball race (38a) in which said balls (40) are freely revolubly mounted is provided with a bent threaded portion (37) engaging the threaded periphery of screw (36) revolubly mounted within frame (1) and having pinion (35) rigidly secured at its top. Knurled wheel (33b), rigid upon shaft (33) revolubly and slidably mounted in frame (1) is provided preferably upon its lower end with a rigid gear (34) and a spring (37a) between said gear (34) and the casing (1). Thus when wheel (33b) is raised against the tension of spring (34a) sufficiently to mesh gears (34) and (35), the revoluble movement of wheel (33b), when held in this position, will cause an adjustment to be made of said balls (40) relative to the centers of their respective discs (9) and (43), so that a different rate of motion will be imparted to said second dial (9).

It will also be observed that the time indicating means of and movable by the secondary time movement (1b) is all driven from the seconds dial (9) and in the instance where its time differs from that of the primary time movement (1a) is only about 30 seconds in 24 hours, then and in such case this is the extent of movement of said dial (9) in said period; and likewise when said time differs only approximately 10 seconds per hour, then such is the rate of movement of said dial (9) and dial (7) rotates relatively slower, so much so that one complete revolution thereof will consume an hour, while movable dial (6) is correspondingly slower in its movement than dial (7) to appropriately indicate the hours.

The hour hand (14) preferably terminates in a relatively sharp point at the outer periphery of movable dial (6), which is substantially that of the inner periphery of stationary dial (5) for indicating only the time kept by the primary time movement (1a).

The times kept by the primary and secondary time movements being essentially different, I have made the indications upon dial (5) of one predominating color, together with the second indications (10) upon the chronometer face plate (4) surrounding disc (9) of the same color, while I have provided the time indicating characters upon movable dials (6), (7) and (9) of a characteristically different predominating color, to further ward against confusion in the respective times kept by the respective time elements.

The point (13a) of hand (13) indicates the minute graduations upon dial (5) while its point (13b) indicates minutes upon the movable dial (7).

Barring spring of the parts and wear of graduations (42a) indicated by point (41), which moves proportionate to the variable speed transmitting balls (40), affords substantially accurate indication of the proper setting of the secondary time movement. However, to ward against such error or spring the setting may be checked for accuracy with the time kept by the primary time movement (1a), or by any other chronometer or means sufficiently accurate to warrant such check.

In Fig. 14 is shown a single timepiece encased in casing 1c, adapted to be substituted for and to perform the functions of the separate timepieces 1a and 1b. The casing 1c is attachable within casing 1 in such position that the shafts 46, 13a and 15, and gears 19, 20 and 21, extending from the front of casing 1c may occupy the same positions respectively of said parts shown in Figs. 1 and 2. From this and the foregoing description any skilled clock maker may, merely by the exercise of his skill, readily construct the mechanism within casing 1c.

It will be apparent from the foregoing that I have provided a simple, convenient and efficient method and apparatus for navigator's time keeping and which may be used in many special instances and by such use afford substantial reductions in the time and labor heretofore required for the solving of the astronomical triangle for determining the navigator's unknown position with equal accuracy to that afforded by existing practices. Those skilled in the art will readily understand the many such aids and short cuts to such determinations affordable by uniform time movement in combination with the variable movement time in close proximity and as part of the same unitary apparatus.

My invention contemplates and requires for its most efficient use many different settings of the variable movement time relatively to the uniform time movement as well as for many different changes in the rate of speed required of the variable movement time mechanism. While I have shown different means for accomplishing each such settings and variations in the rate of speed, any other means therefor may be conveniently provided and employed by those skilled in the art and working after the fact of my invention without departure from the spirit and scope of my invention.

It is also obvious that my said method may be efficiently practiced by any of the many existing forms of time keeping apparatus with or without substantial departure therefrom.

I have endeavored in the description and drawings of my invention to describe and illustrate the same as simply as possible in order that those comparatively unskilled in this highly technical art may readily understand the same and thereby insure that those skilled in the art would more readily and completely understand my invention in its fullest breadth and scope; and to this end I have employed in the main merely diagrammatic illustrations of my invention; but in my said strivings to make my invention appear as simple and understanding as possible, even to those unskilled in the art, I do not desire that the same shall be employed in any way to militate against the substantial breadth and scope of my invention.

The invention hereinbefore described may be manufactured and used by or for the Government of the United States for governmental purposes without the payment to me of any royalty thereon or therefor.

Having now so fully and completely described my invention that others skilled in the art may make and use the same therefrom, what I claim and desire to obtain by Letters Patent is:—

1. In the method of navigators' time keeping, the steps of keeping a time by a movement at a rate corresponding thereto, keeping a different time by a movement at substantially the rate of difference between said last named and said first named times, and indicating said different time by the resultant of both said movements.

2. In the method of time keeping, the steps of keeping a time by a movement at a rate corresponding thereto, keeping a different time by a movement at substantially the rate of difference between said last named and said first named times, and indicating said times at points common to each by a function of said first stated movement for said first mentioned time and by a function of both said movements for said different time.

3. In the method of time keeping, the steps of keeping one time by an accurate time piece, and keeping a different time by a substantially less accurate time piece, with a portion of the time indicators being common to both times.

4. In the method of time keeping, the steps of keeping one time by an accurate time piece, and keeping a different time by a substantially less accurate time movement with said last named time piece moving substantially at the rate of difference between said accurate time and the different time desired.

5. The method of keeping different desired times, including the steps of keeping one time by an accurate time piece, keeping a different time by a time piece having faster and slower moving timing elements and which may be substantially less accurate, indicating said times by indicators common to both times, transmitting the timing movement for said different time first to the faster moving timing element and thence to the slower moving timing element.

6. In the method of indicating different desired times by different juxtaposed time indicating movements indicating different species of time by common indices, the steps of imparting movement from a common source to said indicating movements, continuously moving from said source one of said time indicating movements at a fixed rate, desirably varying the rate of movement imparted from said source to another time indicating movement according to the different species of times desired to be severally kept for any period by said other time indicating movement, and designating by common indices the different species of time presented by the several indicating movements.

7. The method of keeping different desired times by two different concentric sets of time indicating indicia designated by the same hands, comprising the steps of moving the hands by a time movement at a fixed rate, and moving one set of the time indicating indicia by a time movement at a rate proportionate to the difference between the time movement at the fixed rate and the desired different time, and varying said proportionate rate of movement to change the species of time to be indicated for a period by said movable time indicia.

8. In the method of keeping different desired times, the step of keeping several times by making a corresponding number of relative movements, one of which movements corresponding to a primary time and is common to each time to be kept, and the other movement being at a different rate corresponding to the difference between the primary time and the desired different time.

9. In a chronometer, means for keeping one species of time and movable at the rate of such time, and means for keeping a different species of time and movable at substantially the rate of difference between said last named and said first named times, and means for actuating both said means.

10. In time keeping apparatus, means for keeping one species of time and movable at the rate of such time, means for keeping a different species of time and movable at substantially the rate of difference between said last named and said first named times, means for actuating both said means, and means for indicating both said times at points common to each.

11. In time keeping apparatus, means for keeping one time by an accurate timepiece, and means including a portion of the time designation of the first stated means for keeping a different time by a substantially less accurate timepiece adapted to be run at the rate of difference between said times.

12. In time keeping apparatus, means for keeping one time by an accurate timepiece, and means adapted to move substantially at the rate of difference between the first stated time and a desired time for keeping a different time by a substantially less accurate time movement.

13. In time keeping apparatus, means for keeping one time by a substantially accurate time movement, means having indicating elements for keeping a different time by a time movement which may be substantially less accurate than said first stated time movement and one of said elements being movable at a faster rate than the other of said elements, means for transmitting the time movement of said different time primarily to said faster moving element, and means for transmitting said time movement from said faster to said slower moving indicating element.

14. In time keeping apparatus, means for keeping one time at a fixed rate and means for keeping another time at a rate of time movement adapted to be varied for each of the different times desired to be severally kept thereby at different periods and a single means common to and for driving both said means.

15. In time keeping apparatus, means for keeping one time substantially at a fixed rate of movement, means for keeping another time at a different rate of movement, indicating means for each of said time keeping means, a single means common to and for driving both of said time keeping means, and means for varying the rate of movement of said second named means transmitted to its indicating means for each of the different times to be severally indicated thereby at different periods.

16. In time keeping apparatus, means for keeping several times by a substantially corresponding number of relative movements, one of which is the full time movement and another of which is substantially at the rate of difference between the time represented by said full time movement and a desired time, time indicating means adapted to be driven at said rate of difference, and separate time indicating means juxtaposed to the first named indicating means and adapted to be driven by the full time movement to indicate the time kept by said full time movement and in conjunction with said first named indicating means to indicate the time kept by the rate of difference movement.

17. In time keeping apparatus, a plurality of means each adapted to be driven at a different rate, with one of said rates being substantially at the rate of difference between a given time and a desired time, juxtaposed means common in part to each of said times for indicating the time according to each of said plurality of means, and means for communicating the movement of each of said plurality of means to its corresponding indicating means.

18. In time keeping apparatus, means for keeping time, means for indicating said time, and a plurality of variable speed means for communicating the movement of said time means to said indicating means.

19. In time keeping apparatus, means for keeping time, a plurality of gears each driven by said means at a definite different rate of movement, means for indicating said time, and gear means adapted to communicate the movement of either of said gears to said indicating means.

20. In time keeping apparatus, means for keeping time, a plurality of gears each driven by said means at a definite different rate of movement, means for indicating said time, gear means adapted to receive the movement of one of said plurality of gears, and variable speed means for transmitting the movement of said gear means to said indicating means.

21. In time keeping apparatus for indicating on a time indicating means several different species of time, each at different intervals, the combination of means for maintaining a time movement, means for indicating said time, widely variable ratio of movement means intermediate and adapted to operatively connect said two means for imparting the time movement of the time maintaining means at the desired ratio of movement to the time indicating means, said variable means being independent of the usual regulating means, and means for setting the third stated means to transmit the movement of the time keeping means to the time indicating means at each of the different rates required to indicate the desired different species of time at different periods.

22. In time keeping apparatus for indicating on a time indicating means several different species of time, each at different intervals, the combination of means for maintaining a time movement, means for indicating said time, widely variable ratio of movement means for imparting the movement of time maintaining means at the desired ratio of movement to the time indicating means, said variable means being independent of the usual regulating means, means for setting throughout a substantially wide range said variable means to each of the different rates of movement required for the indication of the several species of time desired each at different periods, and means for indicating each of the rates at which said variable means may be set.

23. In time keeping apparatus for indicating on a time indicating means several different species of time, each at different intervals, the combination of means for maintaining a time movement, means for indicating said time, motion transmitting means for imparting the movement of the time movement means at desired different rates of movement to the time indicating means, means for at will manually controlling throughout a substantially wide range the rate of motion at which said transmitting means imparts said movement and said transmitting means being independent of the usual regulating means, and means for indicating the rate at which the transmitting means is being controlled by said controlling means.

24. In time keeping means, means for keeping time, means for indicating two different times, means for normally driving one of said indicating means, and means for driving said other indicating means at the rate of difference between the time indicated by said normally driven indicating means and the time desired to be indicated by said other indicating means.

25. In time keeping apparatus, means for keeping time, means for indicating a plurality of different times and having part of said means common to each time to be indicated thereby, means for normally driving the means for indicating one of said times, and means for driving another of said time indicating means at the rate of difference between the time indicated by said normally driven indicating means and the time to be indicated by said other indicating means.

26. In time keeping apparatus, means for keeping time, means for indicating a plurality of different times and having part of said means common to each time to be indicated thereby, means for normally driving the means for indicating one of said times, means for driving another of said time indicating means at the rate of difference between the time indicated by said normally driven indicating means and the time to be indicated by said other indicating means, and means for varying the rate at which said last named indicating means may be driven.

27. In a time keeping apparatus, the combination of a stationary dial, separate minute and hour hands moving over said dial, a rotatable dial juxtaposed to and concentric with said stationary dial and designated by said hands, a time movement means, means for transmitting the movement of said time means to said hands, and separate variable ratio of movement means for transmitting movement of said time means to said rotatable dial.

28. In a time keeping apparatus, the combination of a stationary dial bearing time indications in a circle, a plurality of rotatable dials each bearing time indications concentric with the first stated time indications, hands mounted at the center of and designating said time indications, a time movement means, means for transmitting the movement of said time means to said hands, and means for transmitting movement of said time means to said rotatable dials at a different rate than the movement transmitted to said hands.

29. In a time keeping apparatus, the combination of a stationary dial bearing hour and minute indications in a circle, rotatable means bearing hour and minute indications concentric with the first stated time indications, hour and minute hands mounted at the center of and designating said time indications, a dial bearing indications of time in seconds, the stationary dial also bearing time indications of time in seconds juxtaposed to the indications on the seconds dial, a second hand designating said seconds indications, a time movement means, means for transmitting the movement of said time means to said hands, and means for transmitting movement of said time means to said rotatable means and said seconds dial at the rate of the difference between the time indicated on the stationary dial and the time desired to be indicated on said rotatable means and second dial.

30. In a time keeping apparatus, the combination of a stationary dial bearing hour and minute indications in a circle, rotatable means bearing hour and minute indications concentric with the first stated time indications, hour and minute hands mounted at the center of and designating said time indications, a dial bearing indications of time in seconds, the stationary dial also bearing indications of time in seconds juxtaposed to the indications on the seconds dial, a second hand designating said seconds indications, a time movement means, means for transmitting movement of said time means to said hands, variable movement means for transmitting movement of said time means to the first stated seconds dial, means for varying the rate at which said variable movement means transmits movement, and means for transmitting the movement of said seconds dial to said rotatable means.

31. In a time keeping apparatus, the combination of a stationary dial bearing hour and minute indications in a circle, rotatable means bearing hour and minute indications concentric with the first stated time indications, hour and minute hands mounted at the center of and designating said time indications, a dial bearing indications of time in seconds, the stationary dial also bearing indications of time in seconds juxtaposed to the indications on the seconds dial, a second hand designating said seconds indications, a time movement means, means for transmitting movement of said time means to said hands, means for transmitting movement of said time means to the first stated seconds dial, and means for transmitting movement of said seconds dial to said rotatable means.

32. In a time keeping apparatus, the combination of a time movement means, means bearing two different sets of time indications including a single set of hands indicating both said time indications and said sets having elements which are adapted to move faster than other elements of said sets, means for transmitting movement of the time means to each one of said elements in one set and to the faster moving one of said elements in the other set, and means for transmitting motion of the last stated faster moving element to its companion slower moving element.

33. In a time keeping apparatus, the combination of time movement means, two indicating means having faster and slower moving elements, means for driving one of said indicating means directly by said time movement means, means for driving a faster moving element of the other indicating means by the time movement means, and means for driving the slower moving element of the other indicating means from said driven faster element.

34. In a time keeping apparatus, the combination of time movement means, means bearing time indicia in a circle, a dial bearing time indicia concentric with the first stated time indicia, means for revolubly mounting said dial, indicating means mounted to move about a point concentric with and to designate both said time indicia, means for directly driving said indicating means by the time movement means, and manually variable ratio of movement means for driving said dial by the time movement means.

35. The combination of claim 34 characterized by its last stated driving means being a variable driving means whose rate of drive is adapted to be definitely varied.

36. In time keeping apparatus, the combination of a stationary dial bearing hour and minute indications in a circle, a rotatable dial means bearing time indicia and concentric with said circle, hour and minute hands adapted to designate said indications and indicia, time movement means, means for driving said hands by the time movement means, and means manually variable in ratio of movement proportionate to the difference between the time indicated by the hands on the stationary dial and the times desired to be indicated by the hands on the rotatable dial means for driving said rotatable dial means by the time movement means.

37. The combination of claim 36 characterized by its last stated driving means being a variable driving means whose rate of drive is adapted to be definitely varied.

38. The combination of claim 36 characterized by its rotatable dial means being formed of a plurality of movable dials one of which is adapted to move at a faster rate than the other, and by its last named driving means being a variable driving means whose rate of drive is adapted to be definitely varied.

39. The combination of claim 34 characterized by means for resetting said dial, and by its last stated driving means being a variable driving means whose rate of drive is adapted to be definitely varied.

40. The combination of a timepiece having concentric hour and minute movable elements, a separate seconds movable element, and a plurality of concentric indicating elements each driven by the timepiece at a rate of movement different from and adjacent said movable elements, and means for driving said seconds element from one of said plurality of elements.

PHILIP VAN HORN WEEMS.